United States Patent
Kurz (10) Patent No.: US 10,415,405 B2
(45) Date of Patent: Sep. 17, 2019

(54) VARIABLE PITCH FAN BLADE SYSTEM

(71) Applicant: UNITED TECHNOLOGIES CORPORATION, Farmington, CT (US)

(72) Inventor: Leslie Charles Kurz, Hebron, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 591 days.

(21) Appl. No.: 15/494,271

(22) Filed: Apr. 21, 2017

(65) Prior Publication Data

US 2018/0306039 A1    Oct. 25, 2018

(51) Int. Cl.
| | | |
|---|---|---|
| *F01B 25/02* | (2006.01) | |
| *F01D 7/00* | (2006.01) | |
| *B64C 11/06* | (2006.01) | |
| *F01D 17/16* | (2006.01) | |
| *B64C 11/32* | (2006.01) | |
| *F01D 5/30* | (2006.01) | |
| *F02C 7/042* | (2006.01) | |
| *F04D 29/32* | (2006.01) | |

(52) U.S. Cl.
CPC ............. *F01D 7/00* (2013.01); *B64C 11/065* (2013.01); *B64C 11/32* (2013.01); *F01D 5/3023* (2013.01); *F01D 17/162* (2013.01); *F02C 7/042* (2013.01); *F04D 29/323* (2013.01); *F05D 2220/36* (2013.01); *F05D 2260/74* (2013.01); *F05D 2260/76* (2013.01)

(58) Field of Classification Search
CPC ........ F01D 5/30; F01D 5/3038; F01D 5/3046; F04D 29/322; F04D 29/34
USPC ....... 416/127, 204, 205, 206, 212, 215, 166; 415/148, 149.4
See application file for complete search history.

(56) References Cited

U.S. PATENT DOCUMENTS

| | | | |
|---|---|---|---|
| 2,495,434 A * | 1/1950 | Troller | B64C 11/30 |
| | | | 415/129 |
| 3,895,884 A | 7/1975 | Andrews | |
| 3,932,054 A * | 1/1976 | McKelvey | F04D 29/362 |
| | | | 415/130 |
| 4,850,801 A | 7/1989 | Valentine | |
| 5,161,948 A * | 11/1992 | Carvalho | B64C 11/325 |
| | | | 416/154 |
| 6,015,264 A | 1/2000 | Violette et al. | |
| 2008/0273976 A1* | 11/2008 | Suciu | F01D 5/148 |
| | | | 416/46 |
| 2011/0129345 A1 | 6/2011 | Towkan | |
| 2016/0376919 A1 | 12/2016 | Miller et al. | |
| 2018/0363481 A1* | 12/2018 | Bailey | F01D 7/00 |

\* cited by examiner

Primary Examiner — John Kwon
(74) Attorney, Agent, or Firm — Snell & Wilmer L.L.P.

(57) ABSTRACT

A gas turbine engine may have a blade receiver for holding a fan blade, wherein the blade receiver is rotatable about a radial axis of the gas turbine engine. The gas turbine engine may also include a variable pitch mechanism comprising an actuation arm. The gas turbine engine may also include a splined index ring disposed between the actuation arm of the variable pitch mechanism and the blade receiver. The splined index ring may include an outer spline and an inner spline.

20 Claims, 8 Drawing Sheets

VARIABLE PITCH FAN BLADE SYSTEM

FIELD

The present disclosure relates to gas turbine engines, and more specifically, variable pitch fan blades of gas turbine engines.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Some gas turbine engines may have a variable pitch fan blade configuration that enables the fan blades to be rotated about their respective radial axes to change the angle of attack of the fan blades.

SUMMARY

In various embodiments, the present disclosure provides a variable pitch fan blade system. The variable pitch fan blade system may include a blade receiver for holding a fan blade, a variable pitch mechanism comprising an actuation arm, and a splined index ring disposed between the actuation arm of the variable pitch mechanism and the blade receiver. In various embodiments, the blade receiver is rotatable about a radial axis of the gas turbine engine.

In various embodiments, the splined index ring has an outer spline and an inner spline. In such embodiments, outer grooves of the outer spline may extend parallel to inner grooves of the inner spline. In various embodiments, the outer grooves and the inner grooves extend parallel to the radial axis. In various embodiments, the outer spline is concentric with the inner spline. In various embodiments, the blade receiver has a first ring spline engaging one of the outer spline and the inner spline and the actuation arm has a second ring spline engaging the other of the outer spline and the inner spline. The first ring spline of the blade receiver may engage the inner spline of the splined index ring and the outer spline of the splined index ring may engage the second ring spline of the actuation arm.

In various embodiments, the outer spline includes X circumferentially distributed outer teeth and each outer tooth of the outer teeth has an outer angular dimension that is $$\frac{360}{X}$$

degrees. The inner spline may include Y circumferentially distributed inner teeth and each inner tooth of the inner teeth may have an inner angular dimension that is $$\frac{360}{Y}$$

degrees. In various embodiments, a non-negative integer multiple of the lesser of the outer angular dimension and the inner angular dimension is equal to the higher of the outer angular dimension and the inner angular dimension plus or minus a predetermined incremental adjustment angle. The predetermined incremental adjustment angle is less than both the outer angular dimension and the inner angular dimension, according to various embodiments.

In various embodiments, the predetermined incremental adjustment angle is about 0.25 degrees. In various embodiments, the non-negative integer multiple is 2. In various embodiments, X is 72 and Y is 137 such that the outer angular dimension of each outer tooth is 5 degrees and the inner angular dimension of each inner tooth is 2.63 degrees.

In various embodiments, the variable pitch fan blade system further includes a fan hub rotatable about an engine central longitudinal axis of a gas turbine engine, a spring element disposed between the fan hub and the blade receiver, the spring element being biased to exert a radially outward force against the blade receiver, and an annular retaining ring disposed around the radial axis and disposed between the fan hub and the blade receiver, the annular retaining ring configured to limit radially outward movement of the blade receiver. In various embodiments, the annular retaining ring is circumferentially segmented. The annular retaining ring may include a plurality of circumferential segments that are detachable from each other.

Also disclosed herein, according to various embodiments, is a gas turbine engine. The gas turbine engine may include a fan hub rotatable about an engine central longitudinal axis of the gas turbine engine and a blade receiver for holding a fan blade. The blade receiver may be rotatably coupled to the fan hub and rotatable about a radial axis of the gas turbine engine. The gas turbine engine may further include a spring element disposed between the fan hub and the blade receiver. The spring element may be biased to exert a radially outward force against the blade receiver. The gas turbine engine may also include a segmented annular retaining ring in direct engagement with the blade receiver, disposed around the radial axis, and disposed between the fan hub and the blade receiver. The segmented annular retaining ring may be configured to limit radially outward movement of the blade receiver to prevent the blade receiver from decoupling and disengaging from the fan hub. The gas turbine engine may also include a variable pitch mechanism having an actuation arm. The segmented annular retaining ring may be in direct engagement with the actuation arm of the variable pitch mechanism. The gas turbine engine may still further include a splined index ring directly coupled between the actuation arm of the variable pitch mechanism and the blade receiver, wherein the splined index ring comprises an outer spline and an inner spline. The blade receiver may include a first ring spline engaging one of the outer spline and the inner spline and the actuation arm may include a second ring spline engaging the other of the outer spline and the inner spline.

Also disclosed herein, according to various embodiments, is a method for adjusting an incidence angle of a fan blade. The method includes disengaging the blade receiver from the splined index ring, then subsequently rotating the blade receiver relative to the splined index ring, and then subsequently re-engaging the blade receiver with the splined index ring, according to various embodiments. The method may further include disengaging the splined index ring from the actuation arm, then subsequently rotating the splined index ring relative to the actuation arm, and then subsequently re-engaging the splined index ring with the actuation arm. In various embodiments, rotating the blade receiver is rotation of the blade receiver about the radial axis and in a first direction and rotating the splined index ring is rotation of the splined index ring about the radial axis and in a second direction.

Rotation of the blade receiver relative to the splined index ring in the first direction may be precisely performed such that the relative rotation is quantified/indexed by a first number of teeth of the inner spline traversed during the rotation. Similarly, rotation of the splined index ring relative to the actuation arm in the second direction may be precisely performed such that the relative rotation is quantified/indexed by a second number of teeth of the outer spline traversed during the rotation. The rotation operations produce a predetermined incremental adjustment angle to the fan blade.

In various embodiments, for example, the outer spline of the splined index ring includes X number of circumferentially distributed outer teeth with each outer tooth of the outer teeth having an outer angular dimension that is $$\frac{360}{X}$$

degrees. In such an example, and according to various embodiments, the inner spline of the splined index ring comprises Y number of circumferentially distributed inner teeth with each inner tooth of the inner teeth having an inner angular dimension that is $$\frac{360}{Y}$$

degrees. In various embodiments, a non-negative integer multiple of the lesser of the outer angular dimension and the inner angular dimension is equal to the higher of the outer angular dimension and the inner angular dimension plus or minus the predetermined incremental adjustment angle. Said differently, the difference between the angular dimensions of the teeth of the respective splines of the splined index ring may be configured such that the seemingly counteractive opposite rotations enables a net incremental adjustment of the fan blade incidence angle that is less than (e.g. more precise) than either angular dimensions of the teeth of the respective outer and inner splines, according to various embodiments. For example, and according to various embodiments, the outer spline may include 72 teeth (e.g., X=72) and the inner spline may include 137 teeth (Y=137), thus producing an outer angular dimension that is 5 degrees and an inner angular dimension that is about 2.63 degrees. In such embodiments, the non-negative integer multiple, described above, may be two (2) such that the inner angular dimension (the lesser of the two angular dimensions: 2.63 degrees) is multiplied by two (2), which equals about 5.25 degrees. The difference between the outer angular dimension, which is 5 degrees, and this multiplied value of 5.25 degrees is 0.25 degrees (i.e., the "predetermined incremental adjustment angle" or the "net incidence angle adjustment").

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Figure 1:
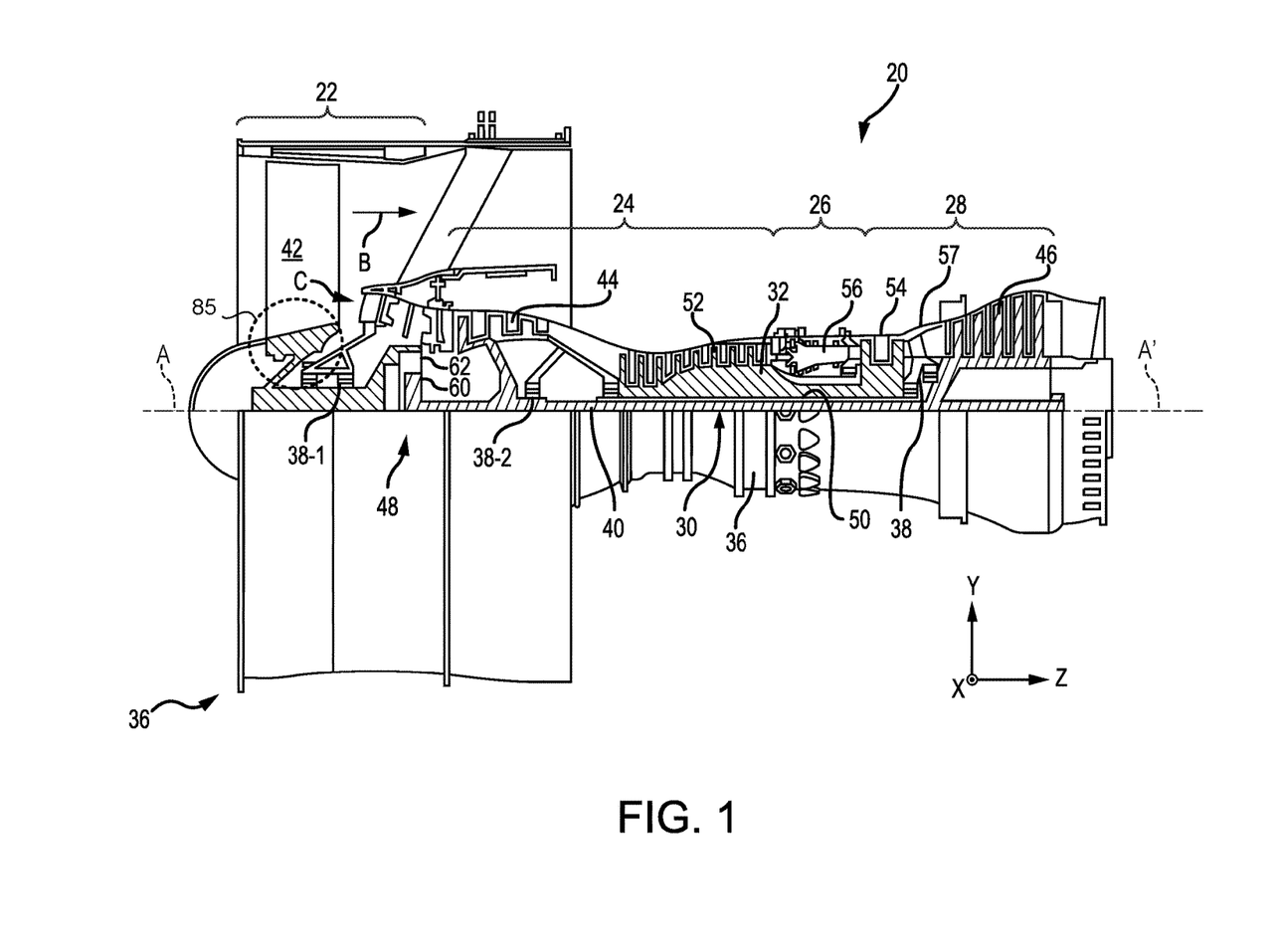
FIG. 1 illustrates a cross-sectional view of a gas turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flowpath C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
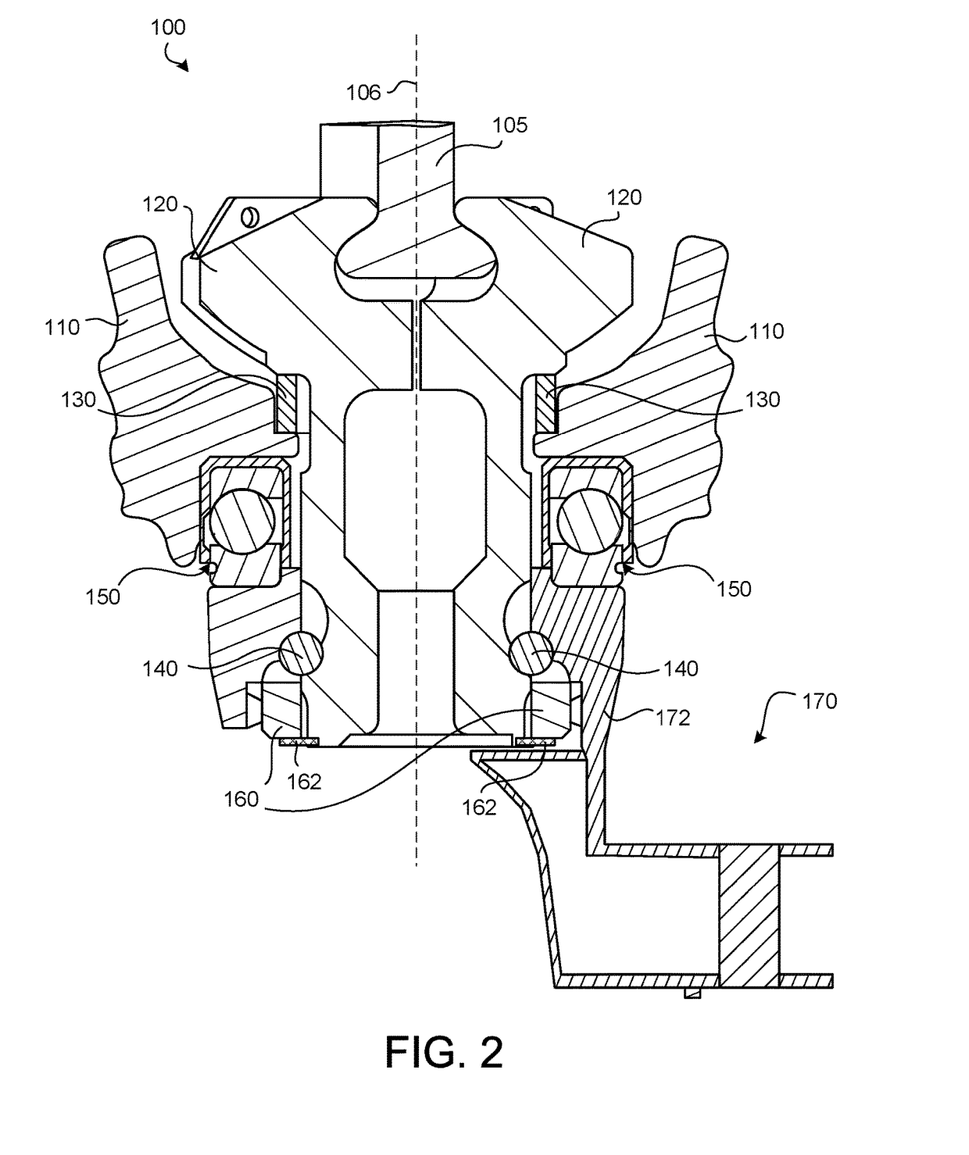
FIG. 2 illustrates a cross-sectional view of a variable pitch fan blade system, in accordance with various embodiments.

The fan section 22 of the gas turbine engine 20 may have a variable pitch fan blade system 100, according to various embodiments and with reference to FIG. 2. The variable pitch fan blade system 100 depicted in FIG. 2 is a cross-sectional view of area 85 generally indicated in FIG. 1. The variable pitch fan blade system 100 is generally configured to enable rotation of fan blades about their respective centerline axes (referred to herein as "radial axes" 106 because the fan blades 105 generally extend radially outward from the engine central longitudinal axis A-A' of the gas turbine engine 20). Changing the pitch of the fan blades 105, also referred to as changing the angle of attack of the fan blades 105, affects the flow of air through the gas turbine engine 20.

The variable pitch fan blade system 100 of the present disclosure provides an alternative and improved structure and assembly for radially retaining the fan blades.

In various embodiments, the gas turbine engine 20 includes a fan hub 110, a blade receiver 120 for holding a fan blade 105, a spring element 130, and an annular retaining ring 140. The fan hub 110 is rotatable about the engine central longitudinal axis A-A' of the gas turbine engine 20 and the blade receiver 120 is rotatable about the radial axis 106 (e.g., centerline axis of the fan blade 105), according to various embodiments. Said differently, the blade receiver 120 may be rotatably coupled to the fan hub 110 or may within a channel defined by the fan hub 110. The spring element 130 is disposed between the fan hub 110 and the blade receiver 120 and is biased to exert a radially outward force against the blade receiver 120, according to various embodiments. The annular retaining ring 140 may be disposed around the radial axis 106 and may be disposed between the fan hub 110 and the blade receiver 120. The annular retaining ring 140 is generally configured to limit radially outward movement of the blade receiver 120, thereby preventing the blade receiver 120 from decoupling and/or disengaging from the fan hub 110, according to various embodiments.

In various embodiments, the gas turbine engine 20 further includes a variable pitch mechanism 170 having an actuation arm 172 that is coupled to the blade receiver 120 to control and actuate the pitch adjustments of the fan blades 105 via the fan blade receiver 120. In various embodiments, a splined index ring 160 may be coupled between the actuation arm 172 of the variable pitch mechanism 170 and the blade receiver 120. The splined index ring 160 may be secured in place via a retaining ring 162 which is assembled onto the blade receiver 120. Additional details pertaining to the splined index ring 160 and the variable pitch mechanism 170 are included below with reference to FIGS. 5-7.

In various embodiments, one or more bearings 150 may be disposed between the fan hub 110 and the blade receiver 120 to enable relative rotation between the fan hub 110 and the blade receiver 120. In various embodiments, the one or more bearings 150 may be disposed between the fan hub 110 and the actuation arm 172 of the variable pitch mechanism 170 to enable relative rotation between the fan hub 110 and the actuation arm 172.

In various embodiments, and with continued reference to FIG. 2, the spring element 130 and the annular retaining ring 140 rotate with the blade receiver 120 about the radial axis 106. Though not having substantial bearing functionality with respect to the rotation of the blade receiver 120 about the radial axis 106 within the confines of the fan hub 110, the spring element 130 and the annular retaining ring 140 may still experience some degree of relative rotation with the adjacent structures (e.g., the blade receiver 120, the fan hub 110, and/or the actuation arm 172 of the variable pitch mechanism 170). Accordingly, the spring element 130 and/or the annular retaining ring 140 may have a wear coating and/or may be made of a self-lubricating material.

In various embodiments, the annular retaining ring 140 cooperates with the spring element 130 to radially retain the blade receiver 120. Said differently, the biased spring element 130 may exert a radially outward force on the blade receiver 120 and the annular retaining ring 140 may counter the radially outward force. In various embodiments, the radially outward force created by the spring element 130 prevents the blade receiver 120 from falling radially inwards, for example when the fan hub 110 is not rotating around the central longitudinal axis A-A' of the gas turbine engine 20 and thus there is no centrifugal load on the blade receiver 120. In various embodiments, the annular retaining ring 140 prevents or at least limits movement of the blade receiver 120 in the opposite (i.e., radially outward) direction, thereby preventing the blade receiver 120 from decoupling and disengaging from the fan hub 110.

In various embodiments, the spring element 130 is a wave spring that extends around the blade receiver. In various embodiments, the spring element 130 may include one or more helical coil springs that are configured to exert the radially outward force on the blade receiver 120. The annular retaining ring 140 may be segmented and thus may have discrete circumferential segments that are detachable from each other. Forming the annular retaining ring 140 from a plurality of circumferential segments may enhance the ease of assembling the variable pitch fan blade system 100. Additional details pertaining to the annular retention ring and how it is installed and/or assembled are included below with reference to FIGS. 3, 4A, and 4B.

Figure 3:
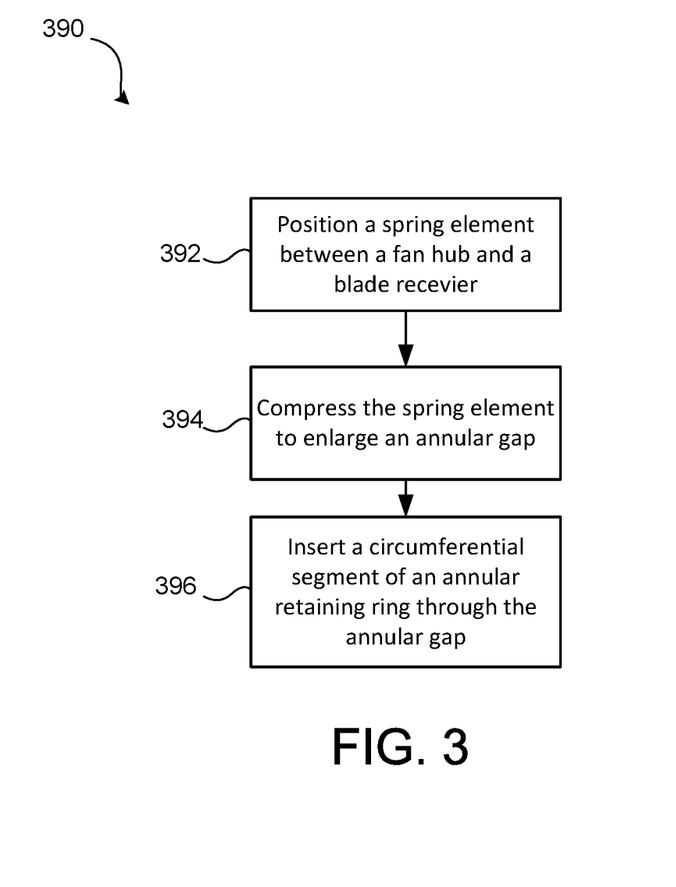
FIG. 3 is a schematic flow chart diagram of a method of assembling a gas turbine engine, in accordance with various embodiments.

In various embodiments, and with reference to FIG. 3, a method 390 of assembling a gas turbine engine is provided. The method 390 may include positioning the spring element 130 between the fan hub 110 and the blade receiver 120 at step 392. The method 390 may further include compressing the spring element 130 to enlarge an annular gap 125 (see FIG. 4A) at step 394. In various embodiments, the annular gap 125 is defined between the fan hub 110 and the blade receiver 120. With the annular gap 125 enlarged, the method 390 may include inserting individual circumferential segments through the annular gap at step 396. The method 390 may further include positioning and orienting the circumferential segments so as to form the annular retaining ring 140 in the desired position/location between the fan hub 110 and the blade receiver 120.

Figure 4A:
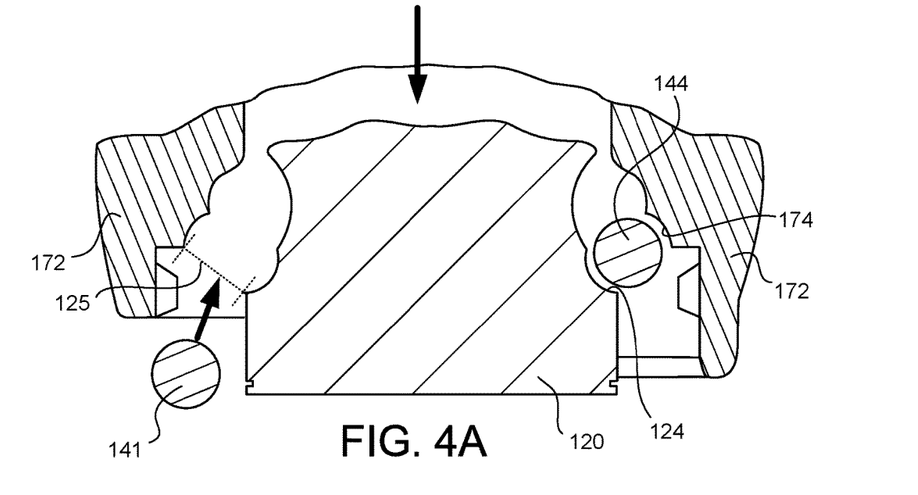
FIG. 4A illustrates a schematic cross-sectional view of a variable pitch fan blade system of a gas turbine engine being assembled, in accordance with various embodiments.

In various embodiments, and with reference to FIG. 4A, step 394 of the method 390 is provided and shown. FIG. 4A shows a partial view of the variable pitch fan blade system 100. Said differently, FIG. 4A, according to various embodiments, depicts the radially inward portion of the blade receiver 120 and depicts pertinent portions of the actuation arm 172 of the variable pitch mechanism 170. Step 394 of the method 390 includes compressing the spring element 130, which moves the blade receiver 120 in a radially inward direction and enlarges the annular gap 125 between the blade receiver 120 and the actuation arm 172 of the variable pitch mechanism 170. In response to the annular gap 125 being enlarged, circumferential segments of the annular retaining ring 140 may be individually inserted through the annular gap 125 and the annular retaining ring 140 may be reassembled in the desired location between the blade receiver 120 and the fan hub 110 and/or the actuation arm 172. In response to the annular retaining ring 140 being properly formed and positioned, the compression force causing the spring element 130 to compress may be released, thereby causing the blade receiver 120 to move in a radially outward direction due by the radially outward force exerted by the spring element 130.

Figure 4B:
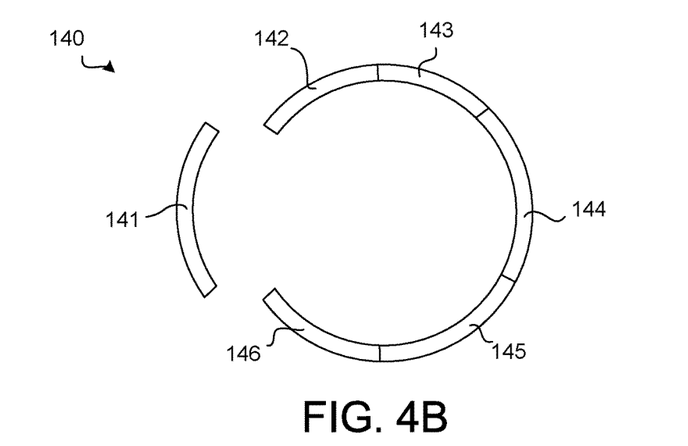
FIG. 4B illustrates a segmented annular retaining ring, in accordance with various embodiments.

In various embodiments, and with reference to FIG. 4B, the annular retaining ring 140 is provided having multiple circumferential segments 141, 142, 143, 144, 145, 146. While FIG. 4B shows the annular retaining ring 140 having six circumferential segments 141, 142, 143, 144, 145, 146, the annular retaining ring 140 may be divided into a different number of segments (e.g., 4, 8, 12, etc.). In various embodiments, the number of circumferential segments is dependent on the size of the annular gap 125 and the features and orientation of the adjacent components.

In various embodiments, the annular retaining ring 140 is made from a metallic material. For example, the annular retaining ring 140 may be made from stainless steel. In various embodiments, the blade receiver 120 and the actuation arm 172 of the variable pitch mechanism 170 annular have mating surfaces 124, 174, respectively, that are configured to match the cross-sectional shape of the annular retaining ring 140. In such embodiments, the direct engagement between the annular retaining ring 140 and the respective mating surfaces 124, 174 is more than a point contact. The term "more than a point contact" refers to direct mechanical contact between workpieces in which the contact interface between the two workpieces is a line or an area (e.g., more than a point). The increased contact area, as compared to an interface that is a single point (e.g., a ball bearing against a raceway), that is created between two workpieces (e.g., between the annular retaining ring 140 and the blade receiver 120) has a higher load capacity. Said differently, direct engagement between the annular retaining ring 140 and the blade receiver 120 may comprise a line engagement or an area engagement that provide sufficient contact area for transferring loads during, for example, operating of the fan section 22 of the gas turbine engine 20. Accordingly, in various embodiments, the annular retaining ring 140 is made from a material that has high shear/transverse strength properties.

Figure 5:
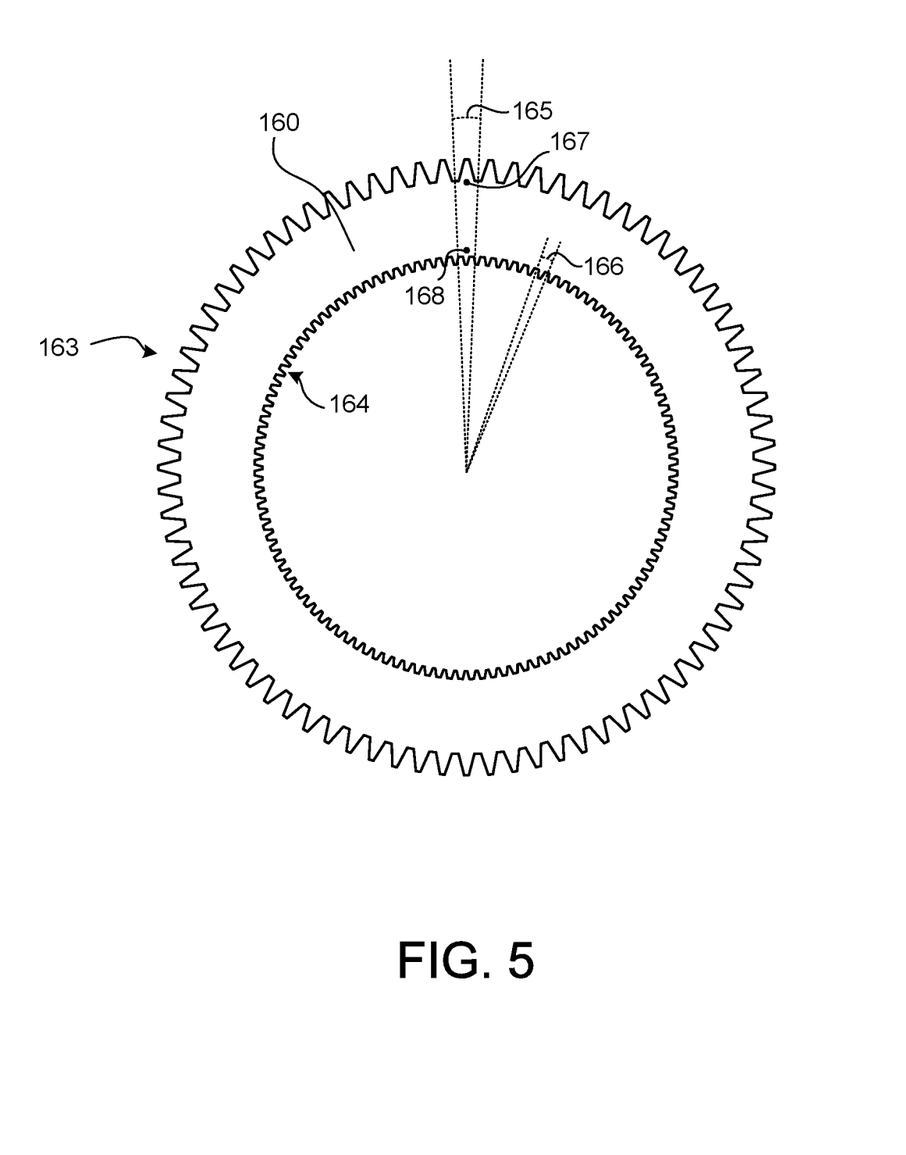
FIG. 5 illustrates a splined index ring, in accordance with various embodiments.

In various embodiments, and with reference to FIG. 5, the splined index ring 160 has an outer spline 163 and an inner spline 164. The splined index ring 160, as mentioned above and with momentary reference to FIG. 2, is disposed between the actuation arm 172 of the variable pitch mechanism 170 and the blade receiver 120, according to various embodiments. The splined index ring 160 may have an annular shape and thus the outer spline 163 may include a pattern of teeth/grooves that are disposed around the outer diameter of the splined index ring 160 and the inner spline 164 may include a pattern of teeth/grooves that are disposed around an inner diameter of the splined index ring 160.

In various embodiments, the outer spline 163 and the inner spline 164 are concentric with each other. In various embodiments, splined index ring 160 is configured to concentrically extend around a radial axis of the gas turbine engine 20 (e.g., a centerline axis of the fan blade). In various embodiments, outer grooves (e.g., channels between adjacent teeth) of the outer spline 163 extend parallel to inner grooves of the inner spline 164. In various embodiments, the splined index ring 160 is a parallel key spline. In various embodiments, the outer grooves and the inner grooves of the outer spline 163 and inner spline 164, respectively, extend parallel to the radial axis (e.g., the centerline axis of the fan blade). Said differently, in various embodiments the splined index ring 160 does not have a helical spline configuration.

In various embodiments, the outer spline 163 includes a first number of outer teeth that are circumferentially and uniformly distributed around the outer diameter of the splined index ring 160 and the inner spline 164 includes a second number of inner teeth that are circumferentially and uniformly distributed around the inner diameter of the splined index ring 160. Accordingly, the angular dimension, in degrees, of each tooth is calculated by dividing 360 degrees by the number of teeth.

In various embodiments, and as described in greater detail below, because the splined index ring 160 facilitates incremental adjustment of the incidence angle of individual fan blades, an outer angular dimension 165, in degrees, of each outer tooth of the outer spline 163 is different than an inner angular dimension 166, in degrees, of each inner tooth of the inner spline 164. The term "angular dimension" of each tooth may also refer to the period of the respective spline 163, 164. That is, the angular dimension of teeth may refer to angular distance (in degrees) between tips of adjacent teeth. FIG. 5 also shows an outer index marking 167, located proximate an outer tooth of the outer teeth of the outer spline 163, and an inner index marking 168, located proximate an inner tooth of the inner teeth of the inner spline 164. In various embodiments, the index markings 167, 168 are aligned, as shown. The index markings 167, 168 may be used as a visual aid tracking the spline tooth offsets when adjusting the incidence angle of the fan blade, as described in greater detail below with reference to FIGS. 6, 6B, and 7. The index markings 167, 168 may be inscribed/formed in the surface of the splined index ring 160.

Figure 6A:
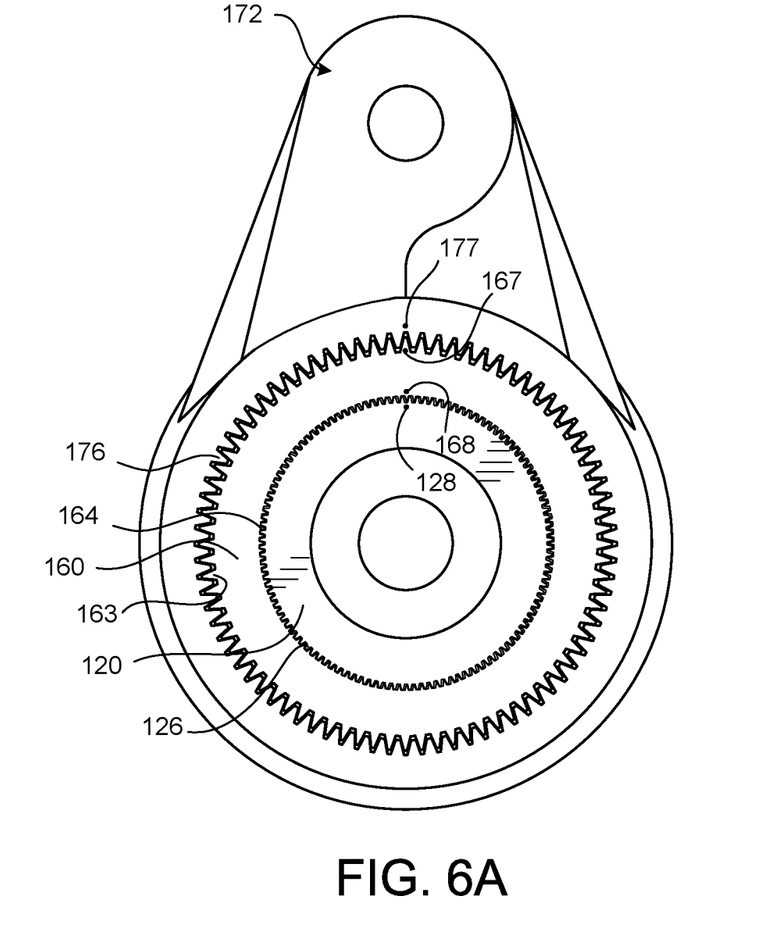
FIG. 6A illustrates a splined index ring engaged between a blade receiver and a variable pitch mechanism, in accordance with various embodiments.

In various embodiments, and with reference to FIG. 6A, the splined index ring 160 is directly engaged between the actuation arm 172 of the variable pitch mechanism 170 and the blade receiver 120. In various embodiments, the blade receiver 120 includes a first ring spline 126 that is configured to directly engage one of the outer spline 163 and the inner spline 164 and the actuation arm 172 includes a second ring spline 176 that is configured to directly engage the other of the outer spline 163 and the inner spline 164. For example, and as shown in FIG. 6A, the second ring spline 176 of actuation arm 172 may have teeth/grooves that correspond with the outer spline 163 of the splined index ring 160 while the first ring spline 126 of the blade receiver 120 may have teeth/grooves that correspond with the inner spline 164 of the splined index ring 160. In various embodiments, the opposite configuration may be employed, with the spline of the blade receiver directly engaging the outer spline and the spline on the actuation arm of the variable pitch mechanism directly engaging the inner spline.

The splined index ring 160, according to various embodiments, is a torque transfer element that conveys the rotation of the actuation arm 172 to the blade receiver 120 to change the pitch of the fan blades. Additionally, the splined index ring 160 enables a user to individually adjust the pitch (e.g., incidence angle) of individual fan blades, for example, during assembly of the gas turbine engine or during a repair operation. Because the outer angular dimension 165 of the outer teeth of the outer spline 163 is different than the inner angular dimension 166 of the inner teeth of the inner spline 164, the incidence angle of each fan blade may be adjusted via a process of disengaging, rotating, and re-engaging the actuation arm 172, the blade receiver 120, and the splined index ring 160. FIG. 6A shows index markings in a nominal, default position. Said differently, in a nominal position the inner index marking 168 of the splined index ring 160 may be aligned with a first index marking 128 of the blade receiver 120 and the outer index marking 167 of the splined index ring 160 may be aligned with a second index marking 177 of the actuation arm 172, in accordance with various embodiments.

Figure 6B:
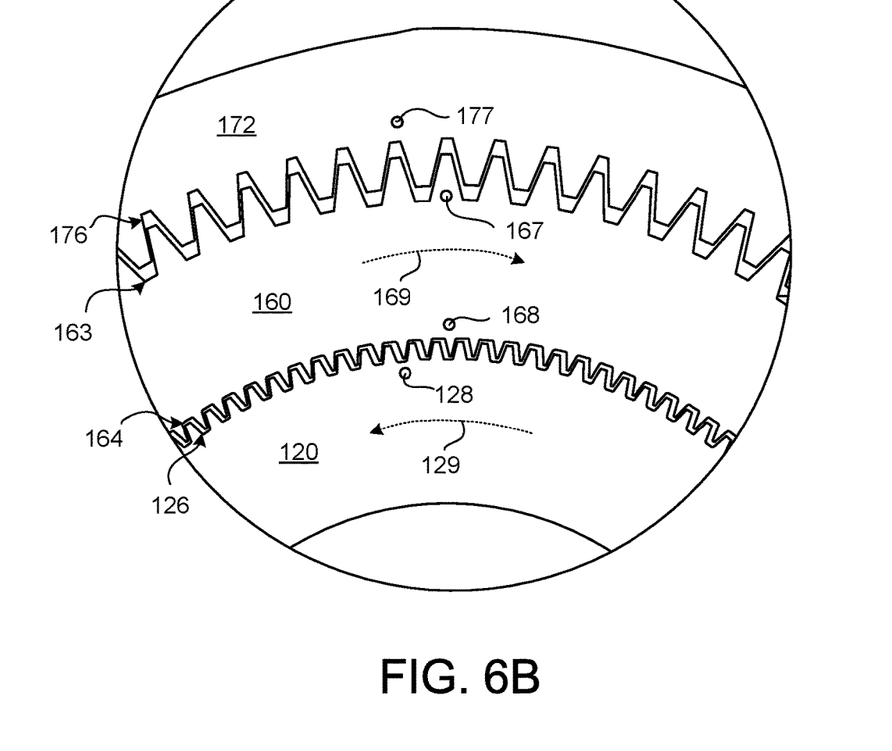
FIG. 6B illustrates a magnified view of the assembly of FIG. 6A after an incremental incidence angle adjustment, in accordance with various embodiments.
Figure 7:
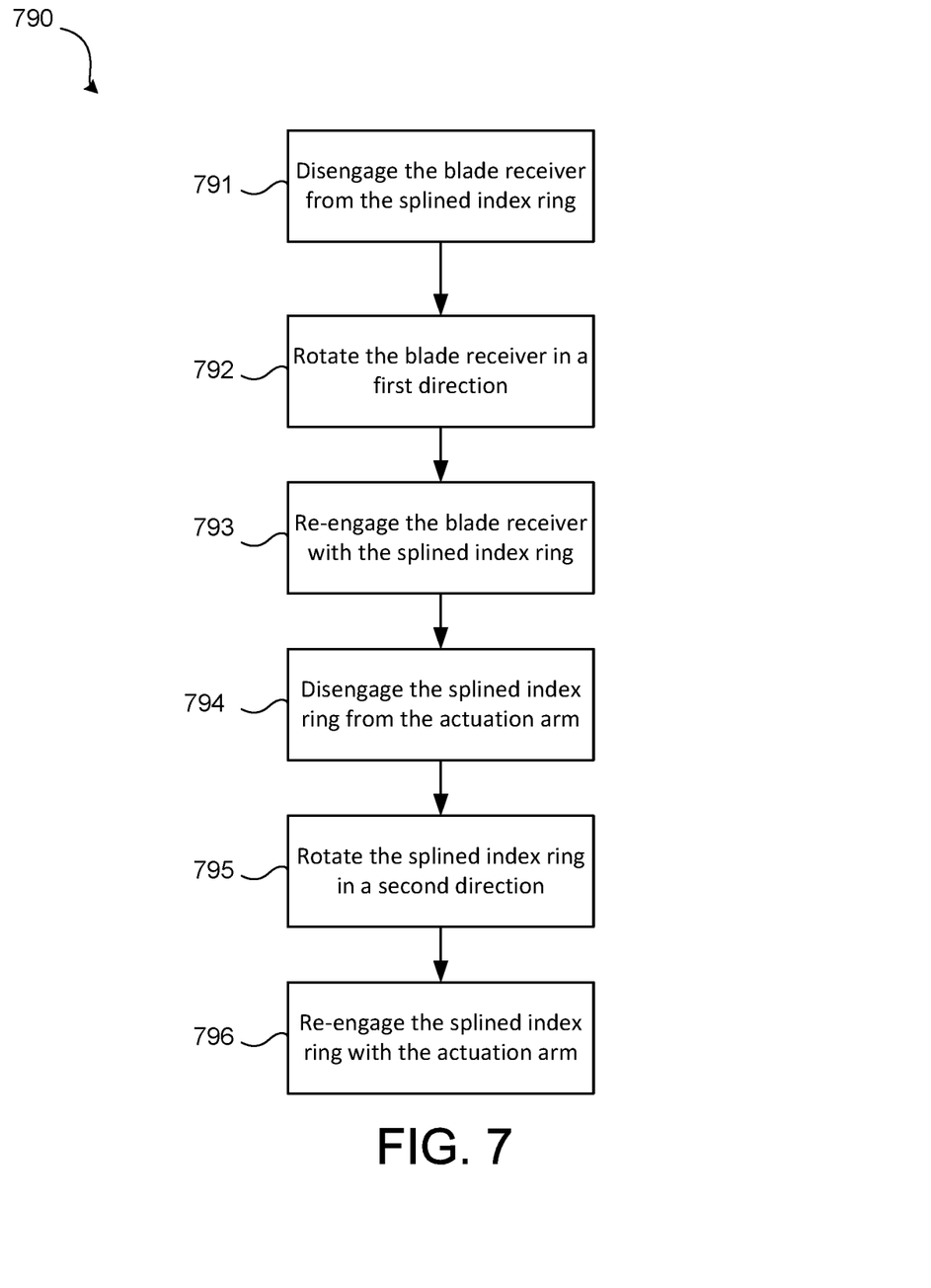
FIG. 7 is a schematic flow chart diagram of a method for adjusting an incidence angle of individual fan blades of a gas turbine engine, in accordance with various embodiments.

In various embodiments, and with reference to FIGS. 6B and 7, a method 790 is provided for adjusting the incidence angle of individual fan blades. The method 790 may be performed in response to determining an incidence angle of a fan blade and comparing the incidence angle with a desired incidence angle (e.g., determining if the determined incidence angle is within an acceptable threshold of the desired incidence angle) to see if adjustment of the pitch of the fan blade is warranted. The method 790 generally includes disengaging the blade receiver 120 from the splined index ring 160 and precisely rotating the blade receiver 120 in a first direction 129 relative to the splined index ring 160 and relative to a specific number of inner teeth of the inner spline 164 of the splined index ring 160 and the method 790 also generally includes disengaging the splined index ring 160 from the actuation arm 172 and precisely rotating the blade receiver 120, via the splined index ring 160 (e.g., together with the splined index ring 160) in a second direction 169, opposite the first direction 129, relative to the actuation arm 172, thereby producing a relative rotation between the splined index ring 160 and the actuation arm 172 that is quantified/indexed relative to a specific number of outer teeth of the outer spline 163 of the splined index ring 160, according to various embodiments.

For example, and with reference to FIG. 6B, the location of the first index marking 128 of the blade receiver 120 relative to the inner index marking 168 of the splined index ring 160 may indicate the extent of rotation of the blade receiver 120 in the first direction 129 from the nominal position shown in FIG. 6A (in which first index marking 128 and the inner index marking 168 were aligned). Continuing the example, and with continued reference to FIG. 6B, the location of the second index marking 177 of the actuation arm 172 relative to the outer index marking 167 of the splined index ring 160 may indicate the extent of rotation of the splined index ring 160 in the second direction 169 from the nominal position shown in FIG. 6A (in which the second index marking 177 and the outer index marking 167 were aligned). Thus, the net incidence angle adjustment of fan blade (e.g., the blade receiver 120) relative to the actuation arm 172 is represented by the angle between radii that extend through the first index marking 128 of the blade receiver 120 and the second index marking 177 of the actuation arm 172, respectively.

In various embodiments, the method 790 includes disengaging the blade receiver 120 from the splined index ring at step 791, then subsequently rotating the blade receiver 120 relative to the splined index ring 160 at step 792, and then subsequently re-engaging the blade receiver 120 with the splined index ring 160 at step 793, according to various embodiments. The method 790 may further include disengaging the splined index ring 160 from the actuation arm 172 at step 794, then subsequently rotating the splined index ring 160 relative to the actuation arm 172 at step 795, and then subsequently re-engaging the splined index ring 160 with the actuation arm 172 at step 796. In various embodiments, step 792 includes rotating the blade receiver 120 about the radial axis and in the first direction 129 and step 795 includes rotating the splined index ring 160 about the radial axis and in the second direction 169.

Rotation of the blade receiver 120 relative to the splined index ring 160 in the first direction at step 792 may be precisely performed such that the relative rotation is quantified/indexed by a first number of teeth of the inner spline 164 traversed during the rotation. Similarly, rotation of the splined index ring 160 relative to the actuation arm 172 in the second direction at step 795 may be precisely performed such that the relative rotation is quantified/indexed by a second number of teeth of the outer spline 163 traversed during the rotation. The rotation operations performed in steps 792 and 795 produces a predetermined incremental adjustment angle to the fan blade. Said differently, the different angular dimensions 165, 166 of the teeth of the splined index ring 160, as described above, together with the opposite and tooth-specific relative rotation in steps 792 and 795, enables the net rotation of the fan blade held in the blade receiver 120 to be precisely tuned and adjusted at a resolution that is smaller than either of the angular dimensions 165, 166 of the teeth of the splined index ring 160.

In various embodiments, for example, the outer spline 163 of the splined index ring 160 includes X number of circumferentially distributed outer teeth with each outer tooth of the outer teeth having an outer angular dimension 165 that is $$\frac{360}{X}$$

degrees. In such an example, and according to various embodiments, the inner spline 164 of the splined index ring 160 comprises Y number of circumferentially distributed inner teeth with each inner tooth of the inner teeth having an inner angular dimension 166 that is $$\frac{360}{Y}$$

degrees. In various embodiments, a non-negative integer multiple of the lesser of the outer angular dimension 165 and the inner angular dimension 166 is equal to the higher of the outer angular dimension 165 and the inner angular dimension 166 plus or minus the predetermined incremental adjustment angle. Said differently, the difference between the angular dimensions 165, 166 of the teeth of the respective splines 163, 164 of the splined index ring 160 may be configured such that the seemingly counteractive opposite rotations of steps 792 and 795 enables a net incremental adjustment of the fan blade incidence angle that is less than (e.g. more precise) than either angular dimensions 165, 166 of the teeth of the respective outer and inner splines 163, 164, according to various embodiments. Accordingly, the structure of the splined index ring 160 and the method 790 disclosed herein enables the incidence angle of the fan blade to be accurately adjusted to a degree that would not be achievable via single direction rotation.

For example, and according to various embodiments, the outer spline 163 may include 72 teeth (e.g., X=72) and the inner spline 164 may include 137 teeth (Y=137), thus producing an outer angular dimension 165 that is 5 degrees and an inner angular dimension 166 that is about 2.63 degrees. In such embodiments, the non-negative integer multiple, described above, may be two (2) such that the inner angular dimension 166 (the lesser of the two angular dimensions: 2.63 degrees) is multiplied by two (2), which equals about 5.25 degrees. The difference between the outer angular dimension 165, which is 5 degrees, and this multiplied value of 5.25 degrees is 0.25 degrees (i.e., the "predetermined incremental adjustment angle" or the "net incidence angle adjustment"). Said differently, by rotating the blade receiver 120 in the first direction 129 relative to two (2) inner teeth of the inner spline 164 (e.g., 5.25 degrees) and by rotating the splined index ring 160 in the second direction 169 such that relative rotation of the actuation arm 172 is relative to one outer tooth (e.g., 5.00 degrees), the net adjustment is about 0.25 degrees, according to various embodiments. In various embodiments, the predetermined incremental adjustment angle may be configured to be about 0.50 degrees. As used in this context only, the term "about" refers to plus or minus 5%.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A variable pitch fan blade system comprising:
   a blade receiver for holding a fan blade, wherein the blade receiver is rotatable about a radial axis of the gas turbine engine;
   a variable pitch mechanism comprising an actuation arm; and
   a splined index ring disposed between the actuation arm of the variable pitch mechanism and the blade receiver.

2. The variable pitch fan blade system of claim 1, wherein the splined index ring comprises an outer spline and an inner spline.

3. The variable pitch fan blade system of claim 2, wherein outer grooves of the outer spline extend parallel to inner grooves of the inner spline.

4. The variable pitch fan blade system of claim 3, wherein the outer grooves and the inner grooves extend parallel to the radial axis.

5. The variable pitch fan blade system of claim 2, wherein the outer spline is concentric with the inner spline.

6. The variable pitch fan blade system of claim 2, wherein the blade receiver comprises a first ring spline engaging one of the outer spline and the inner spline and the actuation arm comprises a second ring spline engaging the other of the outer spline and the inner spline.

7. The variable pitch fan blade system of claim 6, wherein the first ring spline of the blade receiver engages the inner spline of the splined index ring and the outer spline of the splined index ring engages the second ring spline of the actuation arm.

8. The variable pitch fan blade system of claim 7, wherein the outer spline comprises X circumferentially distributed outer teeth, each outer tooth of the outer teeth having an outer angular dimension that is $$\frac{360}{X}$$

degrees and the inner spline comprises Y circumferentially distributed inner teeth, each inner tooth of the inner teeth having an inner angular dimension that is $$\frac{360}{Y}$$

degrees, wherein a non-negative integer multiple of the lesser of the outer angular dimension and the inner angular dimension is equal to the higher of the outer angular dimension and the inner angular dimension plus or minus a predetermined incremental adjustment angle, wherein the predetermined incremental adjustment angle is less than both the outer angular dimension and the inner angular dimension.

9. The variable pitch fan blade system of claim 8, wherein the predetermined incremental adjustment angle is about 0.25 degrees.

10. The variable pitch fan blade system of claim 9, wherein the non-negative integer multiple is 2.

11. The variable pitch fan blade system of claim 10, wherein X is 72 and Y is 137, wherein the outer angular dimension of each outer tooth is 5 degrees and the inner angular dimension of each inner tooth is 2.63 degrees.

12. The variable pitch fan blade system of claim 1, further comprising:
   a fan hub rotatable about an engine central longitudinal axis of a gas turbine engine;
   a spring element disposed between the fan hub and the blade receiver, the spring element being biased to exert a radially outward force against the blade receiver; and
   an annular retaining ring disposed around the radial axis and disposed between the fan hub and the blade receiver, the annular retaining ring configured to limit radially outward movement of the blade receiver.

13. The variable pitch fan blade system of claim 12, wherein the annular retaining ring is circumferentially segmented.

14. The variable pitch fan blade system of claim 13, wherein the annular retaining ring comprises a plurality of circumferential segments that are detachable from each other.

15. A gas turbine engine comprising:
a fan hub rotatable about an engine central longitudinal axis of the gas turbine engine;
a blade receiver for holding a fan blade, the blade receiver rotatably coupled to the fan hub and rotatable about a radial axis of the gas turbine engine;
a spring element disposed between the fan hub and the blade receiver, the spring element being biased to exert a radially outward force against the blade receiver;
a segmented annular retaining ring in direct engagement with the blade receiver, disposed around the radial axis, and disposed between the fan hub and the blade receiver, the segmented annular retaining ring configured to limit radially outward movement of the blade receiver to prevent the blade receiver from decoupling and disengaging from the fan hub, wherein the segmented annular retaining ring comprises a plurality of circumferential segments;
a variable pitch mechanism comprising an actuation arm, wherein the segmented annular retaining ring is in direct engagement with the actuation arm of the variable pitch mechanism; and
a splined index ring directly coupled between the actuation arm of the variable pitch mechanism and the blade receiver, wherein the splined index ring comprises an outer spline and an inner spline, wherein the blade receiver comprises a first ring spline engaging one of the outer spline and the inner spline and the actuation arm comprises a second ring spline engaging the other of the outer spline and the inner spline.

16. A method for adjusting an incidence angle of a fan blade, the fan blade being held by a blade receiver and the blade receiver being rotatable about a radial axis of a gas turbine engine, wherein a splined index ring is disposed between the blade receiver and an actuation arm of a variable pitch mechanism, the method comprising:
disengaging the blade receiver from the splined index ring;
after disengaging the blade receiver from the splined index ring, rotating the blade receiver relative to the splined index ring about the radial axis in a first direction;
after rotating the blade receiver, re-engaging the blade receiver to the splined index ring;
disengaging the splined index ring from the actuation arm of the variable pitch mechanism;
after disengaging the splined index ring from the actuation arm, rotating the splined index ring relative to the actuation arm about the radial axis in a second direction opposite the first direction; and
after rotating the splined index ring, re-engaging the splined index ring with the actuation arm.

17. The method of claim 16, wherein:
rotating the blade receiver relative to the splined index ring comprises rotating the blade receiver relative to a first number of teeth of one of an outer spline and an inner spline of the splined index ring; and
rotating the splined index ring relative to the actuation arm produces a relative rotation of the actuation arm relative to a second number of teeth of the other of the outer spline and the inner spline of the splined index ring.

18. The method of claim 17, wherein the outer spline comprises X circumferentially distributed outer teeth, each outer tooth of the outer teeth having an outer angular dimension that is $$\frac{360}{X}$$

degrees and the inner spline comprises Y circumferentially distributed inner teeth, each inner tooth of the inner teeth having an inner angular dimension that is $$\frac{360}{Y}$$

degrees, wherein a non-negative integer multiple of the lesser of the outer angular dimension and the inner angular dimension is equal to the higher of the outer angular dimension and the inner angular dimension plus or minus a predetermined incremental adjustment angle, wherein the predetermined incremental adjustment angle is about 0.25 degrees.

19. The method of claim 18, wherein rotating the blade receiver comprises rotating the blade receiver a first angular dimension in the first direction and rotating the splined index ring comprises rotating the splined index ring a second angular dimension in the second direction, wherein a net incidence angle adjustment of the fan blade is a non-negative integer multiple of the predetermined incremental adjustment angle.

20. The method of claim 18, wherein the non-negative integer multiple is 2, X is 72, and Y is 137, such that the outer angular dimension of each outer tooth is 5 degrees and the inner angular dimension of each inner tooth is 2.63 degrees.

* * * * *